(12) United States Patent
Ziegltrum (10) Patent No.: US 11,247,278 B2
(45) Date of Patent: Feb. 15, 2022

(54) HYDRAULICALLY CLAMPABLE TOOL HOLDER OR WORKPIECE HOLDER

(71) Applicant: HAIMER GMBH, Igenhausen (DE)

(72) Inventor: Franz Ziegltrum, Igenhausen (DE)

(73) Assignee: Haimer GmbH, Igenhausen (DE)

( * ) Notice: Subject to any disclaimer, the term of this patent is extended or adjusted under 35 U.S.C. 154(b) by 0 days.

(21) Appl. No.: 16/865,826

(22) Filed: May 4, 2020

(65) Prior Publication Data

US 2020/0346289 A1 Nov. 5, 2020

(30) Foreign Application Priority Data

May 2, 2019 (DE) .............................. 102019111281

(51) Int. Cl.
*B23B 31/30* (2006.01)

(52) U.S. Cl.
CPC ....... *B23B 31/305* (2013.01); *Y10T 279/1216* (2015.01)

(58) Field of Classification Search
CPC ............. B23B 31/1175; B23B 31/1176; B23B 31/1177; B23B 31/1178; B23B 31/16287; B23B 31/305; Y10T 279/1021; Y10T 279/1024; Y10T 279/1029; Y10T 279/1087; Y10T 279/12; Y10T 279/1216; Y10T 279/1241; Y10T 279/1283
See application file for complete search history.

(56) References Cited

U.S. PATENT DOCUMENTS

| 3,762,730 | A | * | 10/1973 | Cameron | B23B 31/402 |
| | | | | | 279/2.07 |
| 6,488,285 | B1 | * | 12/2002 | Allard | B23B 31/305 |
| | | | | | 279/4.03 |
| 6,601,856 | B2 | | 8/2003 | Bohler | |
| 6,822,206 | B2 | | 11/2004 | Haimer | |
| 7,182,558 | B2 | * | 2/2007 | Haimer | B23B 31/02 |
| | | | | | 279/4.03 |

(Continued)

FOREIGN PATENT DOCUMENTS

| DE | 102006013662 A1 | 9/2007 |
| DE | 102010008872 A1 | 8/2011 |
| DE | 102013103168 B3 | 1/2014 |

(Continued)

OTHER PUBLICATIONS

Brochure TENDO E compact—"Das Hydro-Dehnspannfutter", [The Universal Hydraulic Expansion Toolholder], Superior Clamping and Gripping, English version 2015.

*Primary Examiner* — Eric A. Gates
(74) *Attorney, Agent, or Firm* — Laurence A. Greenberg; Werner H. Stemer; Ralph E. Locher (57) ABSTRACT

A device for hydraulically clamping tools or workpieces, a tool holder or workpiece holder for short, has a clamping portion for clamping a tool or workpiece. An interior of the clamping portion has a plurality of chambers which are connected in fluidic communication by way of a channel system. In order to be able to change, in particular increase, the dynamic rigidity of the hydraulically clampable tool/workpiece holder, a central throttle point is arranged in the channel system. The central throttle point has an adjustment element with which a flow cross section in the central throttle point can be changed.

12 Claims, 5 Drawing Sheets

(56) References Cited

U.S. PATENT DOCUMENTS 9,676,039 B2 * 6/2017 Doi ..................... B23B 31/1172
9,889,507 B2 2/2018 Haimer

FOREIGN PATENT DOCUMENTS

| | | | | |
|---|---|---|---|---|
| DE | 102016119752 A1 | | 4/2018 | |
| EP | 0394694 A1 | * | 10/1990 | ............. B24B 45/00 |
| EP | 1190815 A1 | | 3/2002 | |
| EP | 1353768 A2 | | 10/2003 | |
| FR | 1524356 A | * | 5/1968 | ............... B66C 1/46 |
| GB | 1445216 A | * | 8/1976 | ........... B23B 31/305 |
| WO | 2018073265 A1 | | 4/2018 | |

* cited by examiner

HYDRAULICALLY CLAMPABLE TOOL HOLDER OR WORKPIECE HOLDER

CROSS-REFERENCE TO RELATED APPLICATION

This application claims the priority, under 35 U.S.C. § 119, of German patent application DE 10 2019 111 281, filed May 2, 2019; the prior application is herewith incorporated by reference in its entirety.

BACKGROUND OF THE INVENTION

Field of the Invention

The invention relates to a device for hydraulically clamping tools or workpieces, a tool holder or workpiece holder for short, with a clamping portion for clamping a tool or workpiece, the interior of which clamping portion has a plurality of chambers which are connected in a fluidally communicating manner by means of a channel system.

It is known for the shank of a tool that is to be chucked on the shank side to be held by means of a press fit in a central receiving opening in an annular, self-contained part, usually embodied as a sleeve part, of a tool holder. The sleeve part forms the tool-side end of a tool holder of otherwise conventional design and extends longitudinally or axially along a longitudinal axis of the tool holder. In the case of rotating tools or tool holders, the longitudinal axis also corresponds to the axis of rotation of the tool holder.

Furthermore, various possibilities for realizing said press fit which holds the shank of the tool to be chucked in the sleeve part of the tool holder are also known.

Thus, according to a first possibility, said sleeve part of the tool holder can be expanded to such an extent in the radial direction by heating that the cold shank of the tool can be pushed into or pulled out of the sleeve part.

As soon as the sleeve part has cooled down again, an interference fit is established between said sleeve part and the shank of the tool, by means of which interference fit the tool is reliably secured in the tool holder (shrink-fitting technology, see, for example, our commonly assigned European patent EP 1 353 768 B1).

A second alternative involves what are referred to as collet chucks, in which the tool shank is held in a frictionally chucked manner by means of a collet by the collet, which is provided with an external cone, being driven into a complementary cone seat and, as a result, being made to close.

Alternatively, according to a third possibility, the tool can also be chucked hydraulically in the tool holder or in the sleeve part.

For this purpose, a hydraulic clamping member is arranged within said sleeve part of such a hydraulically clampable tool holder, said hydraulic clamping member decreasing its inside diameter, which engages around the tool shank, when hydraulic pressure is applied, which can be built up/brought about, for example, by a hydraulic medium, such as oil, and thus chucking the tool shank frictionally.

Such a hydraulically clampable tool holder is known, for example, from the brochure "TENDO, E compact, Das Hydro-Dehnspannfutter" (TENDO, E compact, The hydraulic expansion chuck, Superior clamping and gripping).

This hydraulically clampable tool holder provides a hydraulic clamping system in the form of a plurality of, in this case two, (pressure) chambers connected in a fluidally communicating manner by means of a channel system—referred to there overall as a (pressure) chamber system—within said sleeve part—also referred to below because of the clamping function there for the tool as the clamping portion of the tool holder.

The two (pressure) chambers are designed as annular cavities which are arranged in the interior of the clamping portion, encircle the central receiving opening—with respect to the longitudinal axis of the hydraulically clampable tool holder—coaxially in the circumferential direction about the longitudinal axis of the tool holder/hydraulic expansion chuck and lie axially next to one another—with respect to the longitudinal axis of the hydraulically clampable tool holder.

The two (pressure) chambers are connected in a fluidally communicating manner to each other, in fluid connection for short, via a connecting channel which is likewise designed as an annular gap between the two chambers, the annular gap encircling coaxially in the circumferential direction about the longitudinal axis of the tool holder/hydraulic expansion chuck; the chamber positioned closer to the receiving opening is connected via a pressure channel to a clamping chamber in the tool holder where a pressure can be built up by means of a clamping screw (which can be screwed in from the outside) and a clamping piston in the chamber system, which is filled with a hydraulic medium. This pressure causes the clamping region to arch inwards radially with respect to the longitudinal axis against the tool shank, as a result of which the latter is thus frictionally chucked.

Hydraulically clampable tool holders of this type or such hydraulic expansion chucks with such a chamber system have the disadvantage of being flexible when the chucked tool is loaded.

When the tool is loaded, the hydraulic medium can namely flow "to and fro" via the channel system virtually without a great resistance in the chamber system.

If, for example, the tool is displaced laterally or inclined by means of machining forces, the cross section of a chamber narrows in the direction of the loading and widens in the direction opposed to the loading. At the same time, the cross section of another chamber widens or narrows in the opposite direction. In clear terms, the hydraulic medium flows from one region of the chamber system into the other without providing resistance to the displacement of the tool. The clamping region of hydraulically clampable tool holders of this type or of such hydraulic expansion chucks is flexible, as a result of which they thus lose dynamic rigidity, i.e. the rigidity which occurs during a rapid change of the loading.

Such a reduced dynamic rigidity in said hydraulically clampable tool holders is also associated with a reduced machining precision.

The same also applies to hydraulically clampable tool holders with corresponding hydraulic clamping members which clamp the workpieces in this case.

BRIEF SUMMARY OF THE INVENTION

It is accordingly an object of the invention to provide a tool or workpiece holder, which overcomes the above-mentioned and other disadvantages of the heretofore-known devices and methods of this general type and which provides for a hydraulically clampable tool holder/workpiece holder with which a higher dynamic rigidity and machining precision are possible.

With the above and other objects in view there is provided, in accordance with the invention, a device for hydraulically clamping tools or workpieces, the device comprising:

a clamping portion for clamping a tool or a workpiece, said clamping portion having an interior with a plurality of chambers;

a channel system fluidically connecting said plurality of chambers;

a central throttle point arranged in said channel system; and an adjustment element configured for selectively changing a flow cross section in said central throttle point.

In other words, the objects of the invention are achieved by a device for hydraulically clamping tools or workpieces, a hydraulically clampable tool holder or hydraulically clampable workpiece holder for short, with the features of the independent claim. Advantageous developments of the invention are the subject matter of dependent claims and of the description below.

The hydraulically clampable tool holder or hydraulically clampable workpiece holder, which are both generally referred to below merely as "tool holder" for the sake of simplicity, is provided with a clamping portion for clamping a tool or workpiece (both are then also generally referred to merely as "tool" below for the sake of simplicity), for example a rotation tool, such as a drill bit, a milling cutter, a reaming tool or a cutter head or any object to be processed (mechanically), the interior of which clamping portion has a plurality of chambers which are connected in a fluidically communicating manner by means of a channel system.

A chamber can be understood here as meaning a (hollow) space which is shaped as desired, but in a defined manner (according to specifiable scales) and which is capable in particular of at least temporarily receiving a hydraulic medium, for example an oil. Accidental shrink holes, microstructure pores or other imperfections occurring at undefined points in the material structure of the tool holder/workpiece holder or clamping portion do not constitute chambers within the context of the invention.

Such a chamber can thus be, for example, an annular cavity in the clamping portion, said cavity being in the shape of an annular portion in the circumferential direction or being closed and which preferably runs concentrically with respect to the longitudinal axis of the tool holder/workpiece holder completely in the interior of the clamping portion.

Such a plurality of chambers, i.e. two, three, four or even more chambers, are provided in the tool holder/workpiece holder.

A channel can be understood as meaning a (hollow) space which is likewise formed as desired, but in a defined manner (according to specifiable scales) and which is capable in particular of at least temporarily receiving a hydraulic medium, here also in particular of guiding or conducting same in a flow direction.

Such a channel can be, for example, a bore or gap in the interior of the clamping portion, said bore or gap running radially and/or axially and/or encircling (at least in sections) in the circumferential direction.

In particular, a cross section of such a channel in the tool holder/workpiece holder can be small or small in relation to a cross section of a chamber in the tool holder/workpiece holder.

It is particularly expedient if a channel routing in the channel system is placed in a space-saving manner between the chambers (as a result of which slender outer contours can thus be realized in the tool holder/workpiece holder).

For the sake of simplicity, chambers and channel system may also be referred to below overall as chamber system.

In a fluidically communicating manner can clearly mean that the chamber system forms a network in which a hydraulic medium can flow (to and fro) and the internal pressure of which can be centrally controlled or set, for example by means of a clamping screw/clamping piston, as is known in the case of hydraulic expansion chucks.

Terms which are used, such as "axially" and "radially" and "circumferential direction", "centrally"/"concentrically" and "encircling" are understood here, as per customary understanding, with respect to a longitudinal axis of the tool holder/workpiece holder. If in particular a rotatable tool holder/workpiece holder is involved, the longitudinal axis also corresponds to the axis of rotation of the tool holder/workpiece holder.

The chamber system formed in the interior of the clamping portion is in particular a system which is closed, i.e. is in particular pressure-tight to the outside.

In particular, such chambers or such a chamber system can be part of a (pressure) chamber system of a hydraulic clamping system in the hydraulically clampable tool holder/workpiece holder (cf. hydraulic expansion chucks or hydraulically clampable clamping arbors).

A central throttle point is arranged in the channel system, with an adjustment element, using which a flow cross section in the central throttle point can be actively changed ("(actively) adjustable throttle", "adjustable throttle" for short).

It can also be provided that flow cross sections can be changed at a plurality of points in/at the central throttle point by means of the adjustment element.

Such an adjustment element can be, for example, an element, such as a screw, which projects in the central throttle point or into a cross section of the throttle point (or into a plurality of cross sections of the throttle point) (and is thus capable (in the event of a change in position thereof) of changing said cross section (or said cross sections)). Even an elastically deformable wall in the central throttle point can be such an adjustment element.

Such a central throttle point in the tool holder/workpiece holder can be understood as meaning in particular a (hollow) space which can receive a (hydraulic) medium and via which supply channels opening there are directly in flow connection. Via said central throttle point, all of the chambers of the chamber system are thus also in fluidal connection with one another (indirectly and/or directly).

In clear terms, a hydraulic medium, for example an oil, in particular an oil having high viscosity, can flow (to and fro) in the chamber system via the central throttle point.

Such a central throttle point can in this case also be, for example, a chamber, a bore or similar. It can be expedient that a cross section of the central throttle point is naturally small.

In particular, it can also be provided that the channel system provides a plurality of supply channels, wherein each of the plurality of supply channels of the channel system leads only to in each case one of the chambers of the chamber system. A first supply channel end of the respective supply channel ends/opens in the just one chamber; a second supply channel end of the respective supply channel ends/opens in the central throttle point ("separate supply channels").

In simplified and clear terms, each chamber of the plurality of chambers connected by the channel system has its own separate supply channel which only connects it to the central throttle point or which all open into the central throttle point (similarly to a central connecting point/intersecting point).

By this means, i.e. by means of such separate supply channels for the chambers, a hydraulic medium flowing (to and fro) between the chambers in the chamber system is forced (forcibly) to flow via the central throttle point.

The hydraulically clampable tool holder/workpiece holder is based on the consideration that (if the chamber system is filled with hydraulic medium, such as oil, in particular an oil having high viscosity) a flow resistance for the hydraulic medium, for example the oil, can be changed, in particular increased, in the central throttle point ("adjustable throttle") by a change in the flow cross section, in particular a narrowing of the flow cross section, which can be brought about by means of the adjustment element.

Such a changed or increased flow resistance in the central throttle point is associated with a dynamic change in rigidity or increase in rigidity in the hydraulically clampable tool holder/workpiece holder, and the chambers which make up the clamping portion of the tool holder/workpiece holder are in (fluidal) flow connection with their channel system, in particular inevitably with in each case separate supply channels, via the central throttle point.

In short and simply, if the flow cross section in the central throttle point can be reduced by the adjustment element, it is thereby possible to increase the flow resistance of the hydraulic medium in the chamber system and thus the dynamic rigidity in the tool holder/workpiece holder.

If, moreover, the central throttle point, with its adjustable flow cross section, is a narrow point which is "forced" in particular in the event of separate supply channels, a damping effect can thereby also arise. If namely, in the event of a corresponding loading of the tool holder/workpiece holder (and deflection), the hydraulic medium is pressed out of a chamber into the central throttle point or will flow to there, a resistance arises in the central throttle point because of the flow cross section in the manner of a narrow point. The hydraulic medium has to be pressed through said flow cross section. High flow speeds and friction arise here, for which energy has to be applied. This energy is extracted from the applied movement (vibration). A damping effect arises, similarly as in the case of hydraulic shock absorbers. The deflection is reduced.

It may also be expedient to use a hydraulic medium or a pressure medium, the viscosity of which rises in the event of pressure and/or movement.

It is expedient in particular that—because of the complex chamber system—the clamping portion (or a substantial portion thereof), in particular the chamber system, has been or is produced by an additive production method, for example by means of fused deposition modeling.

Such fused deposition modeling is distinguished in that the component is produced layer by layer by the fact that a further layer of a metal material, which is generally present originally in powder form, is melted or sintered onto each previous layer, generally by means of a laser.

The clamping portion can preferably be/have been built up, for example, from individual metal layers which are applied successively to one another until the clamping portion (or a substantial portion, for example an undercut region to be formed only locally) has (its) a specified shape.

The metal layers forming the clamping portion can preferably be melted here from a mixture of different or differently alloyed metals.

Certain regions of the clamping portion can thereby be improved in terms of material for certain tasks. Thus, locally particularly stressed points can be manufactured from a material having increased resistibility without the entire clamping portion equally having to be manufactured from such a material which is often expensive and/or can be brought into the desired shape only with an increased expenditure of time.

Similar is true of points of which, for example, particularly high electrical and/or magnetic conductivity is anticipated. For example, the clamping portion embodied as a sleeve part can be provided with an outer portion which is composed of a metal material in which heat can be generated inductively under the influence of an alternating magnetic field, and said sleeve part can obtain an inner portion which is connected thereto in one material therewith, forms the tool fitting and is composed of a metal material which has a higher thermal expansion than the material of the outer portion.

That is to say, the composition of the metal layers is locally varied more than merely insubstantially in such a manner that the metal layers locally have particular mechanical and/or electrical and/or magnetic properties.

It is also expedient if the cross sections of the supply channels are small in relation to the cross sections of the chambers. Short narrow supply channels (in relation to wider, larger chambers) are expedient.

If, namely, in the event of a corresponding loading of the tool holder/workpiece holder (and deflection), the hydraulic medium were then pressed out of a chamber into the narrow supply channel or were to flow into the latter, a resistance arises because of the narrow channel cross section. The hydraulic medium has to be pressed through the channel. High flow speeds and friction arise here, for which energy has to be applied. This energy is extracted from the applied movement (vibration). A damping effect arises, similarly as in the case of hydraulic shock absorbers. The deflection is reduced.

If the clamping portion of the tool holder/workpiece holder is heated by the energy which is extracted from the vibration, said heat is output to the surroundings.

In particular, it can be expedient if the chamber system is part of a clamping member in the case of a hydraulically clampable tool holder, such as a hydraulic expansion chuck, or workpiece holder, such as a hydraulically clampable clamping arbor. That is to say, if the central throttle point is a clamping chamber and/or the adjustment element is a clamping screw/clamping piston of a hydraulic clamping system in the hydraulically clampable tool holder/workpiece holder.

In brief simplified terms, the adjustable throttle/the central throttle point is the same as the clamping chamber, or the adjustment element and the clamping screw/clamping piston are the same.

When the clamping screw/clamping piston is actuated, the hydraulic medium is pressed (in a known manner) into the hydraulic clamping system or into the (pressure) chamber system/the (pressure) chambers, as a result of which the clamping portion is deformed. The clamping portion is clamped ("outwards or inwards"). Towards the end of the clamping operation, the supply channels opening into the central throttle point or the clamping chamber can then be virtually closed by the clamping screw/the adjustment element.

If the adjustment element is completely screwed in—and if the supply channels can then be closed by the clamping screw/the adjustment element, separate closed chambers are thereby formed, which lead to a greater rigidity for the tool holder/workpiece holder.

The throttle effect arises because of a low remaining residual cross section between the clamping screw/the adjustment element and the supply channels opening into the central throttle point or the clamping chamber.

The supply channels themselves here can also have a relatively large cross section, which is advantageous because manufacturing is simpler.

It is also expedient if the chamber system including the adjustment element, the entire system for short, does not have an imbalance or is finely balanced. It is particularly expedient here if the chambers and/or the channels are arranged symmetrically. Imbalances from the adjustment element can be compensated for by the configuration of the chamber system and/or other "imbalance elements", such as further cavities.

The adjustment element or the clamping screw does not inevitably have to be rotated into an end position. It can be configured in such a manner that the throttle cross section can be changed depending on the position of the adjustment element or the clamping screw.

In the event of loading by means of a tool/workpiece chucked in the tool holder/workpiece holder, the hydraulic medium can flow out of loaded (pressure) chambers through the respective supply channels in the direction of the central throttle point or the clamping chamber. The flow is throttled here by the narrow points (of supply channel and/or central throttle point). From the clamping chamber or the central throttle point, the hydraulic medium can flow further into the supply channels to the (pressure) chambers, which are in each case relieved of load, in turn through the narrow points. The double throttle effect thus arises—with a dynamic increase in rigidity and damping action.

It can be expedient, in particular in the case of a plurality or multiplicity of chambers in the clamping portion, to provide at least two channel systems in accordance with the channel system described, wherein then the flow cross sections of the then at least two central throttle points of the at least two channel systems can be changeable using (only) a single common adjustment element.

In short, a single adjustment element "operates/changes" the at least two throttle points of the at least two channel systems (and can change the flow cross sections thereof).

That is to say, the tool holder/workpiece holder or the clamping portion has a multiplicity of (pressure) chambers (and it is thus not possible under some circumstances for space reasons to allow all the supply channels to open into a single central throttle point), and it can thus preferably be provided that the ("originally" only) one channel system (with the multiplicity of supply channels) "can be divided" between two (or more) channel systems (having a correspondingly reduced number of respective, in particular individual/separate, supply channels).

If then, corresponding to the division, two or more central throttle points arise, it may be expedient in particular (instead of a possible two or more adjustment elements) to furthermore provide "only" one single adjustment element which, in particular simultaneously, changes the flow cross sections of the now two or more central throttle points.

It can also be particularly expedient here to arrange the two or more central throttle points in the clamping portion in a manner offset radially with respect to one another (with respect to the longitudinal axis of the tool holder/workpiece holder), in particular at the same axial height.

The flow cross sections in the case of the central throttle points which are arranged offset radially with respect to one another (with respect to the longitudinal axis of the tool holder) or are arranged offset axially with respect to one another (with respect to such an adjustment screw) can then be changed (simultaneously) via a radially insertable adjustment element, for example an adjustment screw which can be screwed radially (from the outside) into the clamping portion via a radial bore.

The screwing-in direction of the adjustment element may also be offset laterally here with respect to the longitudinal axis of the tool holder/workpiece holder.

Such a bore can be sealed to the outside here by means of sealing elements, between the bore and the adjustment element or the adjustment screw.

The multiplicity of (pressure) chambers can be divided between one, two or more channel systems here in accordance with design and/or structural requirements/circumstances. In particular, a simple and space-saving channel routing under structural circumstances is expedient.

Furthermore, it can also be provided to arrange the chambers in the clamping portion in structured form, in particular symmetrically and/or in a regular structure, as a result of which a uniform and centered clamping of a tool/workpiece in the tool holder/workpiece holder or in the clamping region can be realized.

Such a structure can also consist, for example, in that the chambers are arranged in a manner distributed uniformly in the clamping portion in the circumferential direction, in particular concentrically with respect to the longitudinal axis of the tool holder/workpiece holder, and/or in that the chambers are arranged in the clamping portion in one or more normal planes with respect to the longitudinal axis of the tool holder/workpiece holder. If a plurality of normal planes are provided for the chambers, said normal planes can in particular also be arranged at in each case the same axial distance from one another. This makes it possible in particular to achieve a high quality in terms of balancing.

Numerous configurations for chamber structures are known, for example, from our commonly assigned German patent DE 10 2013 103 168 B3 and its counterpart publication US 2020/0016665 A1.

Furthermore, it may be expedient if the adjustment element, in particular the one single adjustment element, in the case of two or more central throttle points has a conical portion or a plurality of conical portions. Cylindrical portions can be formed here between conical portions.

If the flow cross section then changes via a positional displacement of said conical portion or said conical portions in the central throttle point or in the central throttle points, a highly "sensitive" and continuous dynamic change/adaptation in rigidity can thus be brought about.

The description of advantageous configurations of the invention that has been given above contains numerous features which are repeated in the individual dependent claims, in some cases combined into groups. However, a person skilled in the art will expediently also consider these features individually and combine them to give appropriate further combinations.

Even though some terms are used in each case in the singular or in combination with a numeral in the description and/or in the claims, the scope of the invention is not intended to be limited to the singular or the respective numeral for these terms. Furthermore, the words "a" or "an" are not intended to be understood as numerals, but rather as indefinite articles.

The properties, features and advantages of the invention that are described above and the manner in which they are achieved will be more clearly and distinctly comprehensible in conjunction with the description below of the exemplary embodiments of the invention, which will be explained in greater detail in conjunction with the drawings/figures (identical components and functions have the same reference signs in the drawings/figures).

The exemplary embodiments are used to explain the invention and do not restrict the invention to combinations of features specified therein, not even with respect to functional features. For this purpose, it is furthermore also possible for suitable features of each exemplary embodiment to be considered explicitly in isolation, removed from one exemplary embodiment, introduced into another exemplary embodiment in order to supplement the latter and combined with any one of the claims.

Other features which are considered as characteristic for the invention are set forth in the appended claims.

Although the invention is illustrated and described herein as embodied in a hydraulically clampable tool holder or workpiece holder, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Referring now to the figures of the drawing in detail the embodiments shown in FIGS. 1-5 and described below relate to hydraulically clampable tool holders 1 (only tool holder 1 below for short), which are generally also known as hydraulic expansion chucks. Tools, such as milling cutters, are hydraulically chucked (not illustrated) by means of such tool holders.

For the purpose, a hydraulic clamping member is arranged within a sleeve part, also called clamping portion 2 below, of such a tool holder 1. As the clamping member decreasing its inside diameter, it engages around the tool shank, when hydraulic pressure is applied, which can be built up/brought about, for example, via a hydraulic medium, such as oil, thus chucking the tool shank frictionally.

The clamping portions 2 of the tool holder 1 described below are produced by way of fused deposition modeling.

Figure 1:
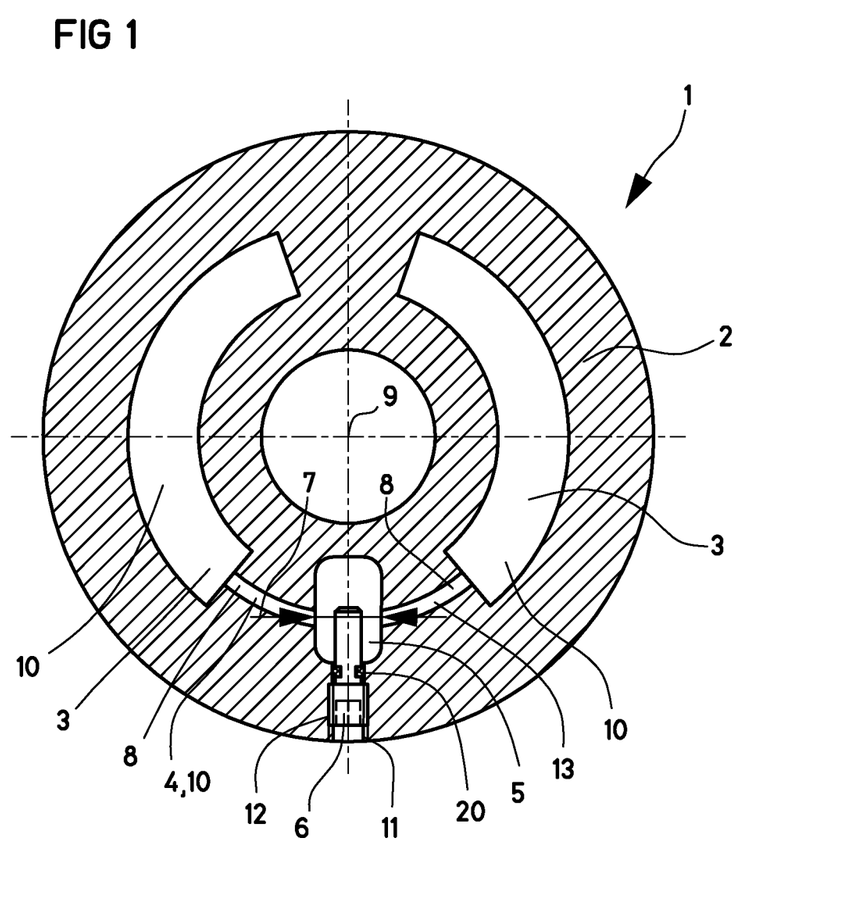
FIG. 1 shows a section through a clamping portion of a hydraulically clampable tool holder according to a first embodiment.

Referring now more particularly to FIG. 1, there is shown a normal section (with respect to the longitudinal axis 9 (also axis of rotation) of the hydraulically clampable tool holder 1 through the clamping portion 2 of such a tool holder 1.

Two (separate) symmetrical (pressure) chambers 3 which are in the shape of an annular portion concentrically with respect to the longitudinal axis 9 are formed in the interior of the clamping portion 2, said (pressure) chambers 3 also extending in the clamping portion 2 axially concentrically with respect to the longitudinal axis 9 of the tool holder.

The two chambers 3, as FIG. 1 also shows, are fluidically connected to one another via a channel system 4 (lying in the sectional plane). That is to say, the two chambers are fluidally connected to each other via the channel system 4 (and the central throttle point 5 described below); a hydraulic medium/hydraulic fluid 10, such as oil, can flow to and fro between the two chambers 3 via the channel system 4 (and the central throttle point 5).

The chambers 3 and the channel system 4 thus also form the chamber system 13 in the tool holder 1.

The channel system 4 provides two supply channels 8—in the form of concentric bores encircling in certain sections—each of which connects one of the two chambers 3 to a central (throttle) point 5 in the channel system 4 ("separate supply channels"), via which central throttle point 5 the hydraulic medium 10 can (or has to) flow to and fro between the two chambers 3.

The central throttle point 5 is designed as a radially running cylindrical cavity, into which the two supply channels 8 of the chambers 3 open laterally.

An adjustment element 6—in the form of an adjustment screw—which is adjustable in its position projects into the cavity or the central throttle point 5.

Via a radial bore 11 which connects the central throttle point 5 to the outside and has an internal thread 12, the adjustment screw 6 can be screwed into/unscrewed from the bore 11 and thus into/from the cavity/central throttle point 5. The channel system 4 is thus also closed in a pressure-tight manner to the outside via the adjustment screw 6. A seal 20 can also be provided for this purpose.

The diameter of the adjustment screw 6 (and thus also the radial bore 11 with the internal thread 12) is smaller here than the diameter of the central throttle point/cavity 5, as a result of which a "flowing to and fro" of the hydraulic medium 10 in the chamber system 13 is maintained in the event of a variable flow resistance in the central throttle point 5.

The flow cross section 7 in the central throttle point 5 is changed by screwing in or unscrewing the adjustment screw, but without completely suppressing the flow in the channel system 4 via the central throttle point 5.

The interior of the central throttle point 5, differently than illustrated, may also be designed as a hollow cone running radially (at least in sections). The adjustment screw 6 can also be formed conically/in a cone-shaped manner (at least in sections) (corresponding to the hollow cone).

Irrespective of the channel system 4 connecting the two chambers 3 and the throttle point 5 of said channel system, which is adjustable/changeable in its flow cross section by means of the adjustment screw 6, the chamber system of the tool holder 1 also provides a pressure chamber (not illustrated) (which is conventional per se) and is also fluidically connected to the chamber system and has an externally actuable clamping screw/clamping piston arranged there—for building up pressure for/and clamping the tool holder 1 (not illustrated).

For this purpose, for example, one of the two chambers 3 of the tool holder 1 can be connected (not illustrated) to the clamping chamber via a further (pressure) channel.

By actuation of the clamping screw/clamping piston, the hydraulic medium is pressed into the chamber system 13 and (clamping) pressure is built up, as a result of which the clamping portion 2, i.e. specifically an inner wall of the sleeve part, arches inwards towards the receiving opening.

The tool holder 1 is based on the consideration that the flow resistance for the hydraulic medium 10 in/at the central throttle point 5 can be changed, in particular increased, ("adjustable throttle") by the change in flow cross section, in particular narrowing of the flow cross section, in/at the central throttle point 5, which can be brought about by means of the adjustment screw 6.

Such a changed or increased flow resistance in/at the central throttle point 5 is associated with a dynamic change in rigidity or increase in rigidity in the tool holder 1, if the chambers 3 which make up the clamping portion 2 of the tool holder 1 are in (fluidal) flow connection to their channel system 4 (forced by the separate supply channels) via the central throttle point 5.

If, moreover, also, as FIG. 1 shows, the cross sections of the supply channels 8 are small in relation to those of the chambers 3 (the same also applies to the central throttle point 5), in the event of a corresponding loading of the tool holder 1 (and deflection), the hydraulic medium is pressed out of the one chamber 3 into its narrow supply channel 8, with a resistance arising because of the narrow channel cross section. The hydraulic medium 10 has to be pressed through the supply channel 8. High flow speeds and friction arise here, for which purpose energy has to be applied. This energy is extracted from the applied movement (vibration). A damping effect arises, similarly as in the case of hydraulic shock absorbers. The deflection is reduced.

Figure 2:
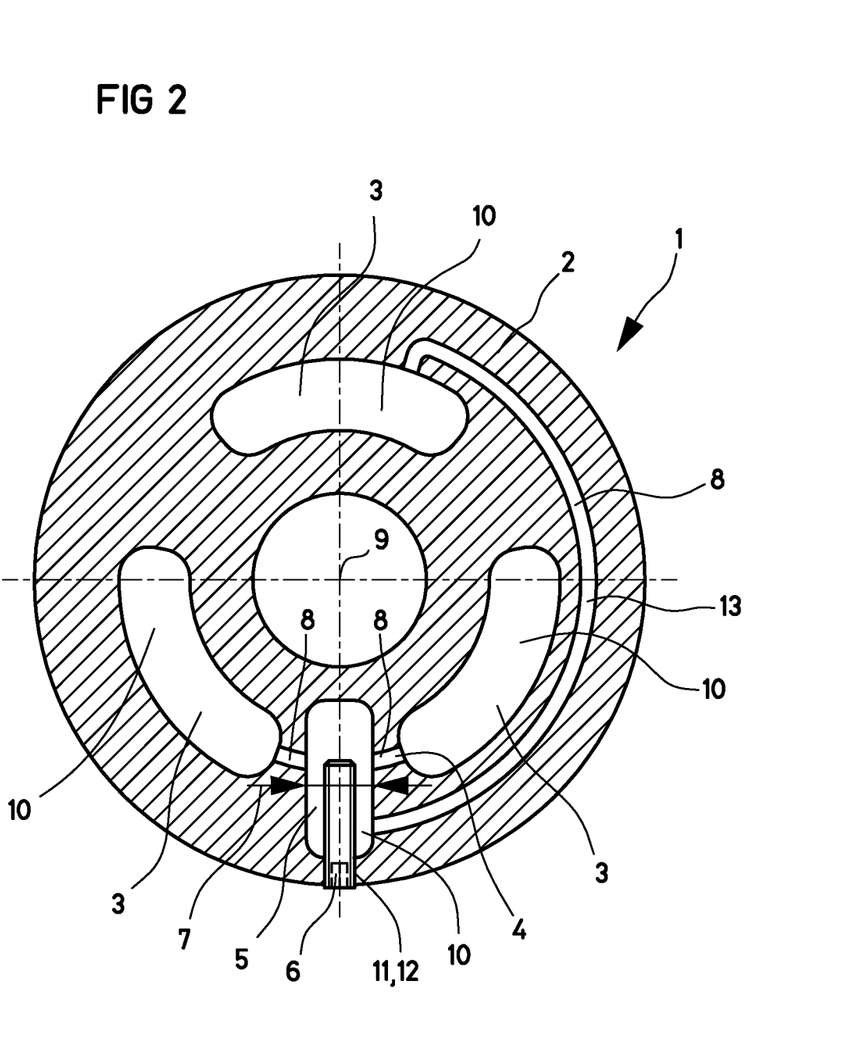
FIG. 2 shows a section through a clamping portion of a hydraulically clampable tool holder according to a second embodiment.

Referring now more particularly to FIG. 2, there is shown a further embodiment of the tool holder 1—again in a normal section through the clamping portion 2 of the tool holder 1.

This embodiment differs from the first embodiment (according to FIG. 1) only by the configuration of the chamber system 13.

Otherwise, the tool holder 1 is constructed as in the embodiment described in detail previously, and therefore mutually corresponding parts are also provided with the same reference signs. With regard to the description thereof, reference is made to the first embodiment. Corresponding effects as for the tool holder 1 according to the first embodiment also arise here.

Three (separate) (pressure) chambers 3 which are uniformly distributed concentrically with respect to the longitudinal axis 9, are in the shape of annular portions and which also extend in the clamping portion 2 axially with respect to the longitudinal axis 9 of the tool holder are formed in the interior of the clamping portion 2 of the tool holder 1.

The three chambers 3 are fluidically connected to one another via a channel system 4 (lying in the sectional plane). That is to say, the three chambers 3 are fluidically connected to one another via the channel system 4 (and the central throttle point 5); a hydraulic medium/hydraulic fluid 10, such as oil, can flow to and fro between the three chambers 3 via the channel system 4 (and the central throttle point 5).

The chambers 3 and the channel system 4 also again here form the chamber system 13 in the tool holder 1.

The channel system 4 provides three supply channels 8, in the form of concentric bores encircling in some sections, of which each connects one of the three chambers 3 to a central (throttle) point 5 in the channel system 4 ("separate supply channels"), via which central throttle point 5 the hydraulic medium 10 can (or has to) flow to and fro between the three chambers 3.

The central throttle point 5, as is also illustrated in FIG. 2, is designed as a radially running cylindrical cavity, into which the three supply channels 8 of the chambers 3 open laterally.

An adjustment element 6—in the form of an adjustment screw—which is adjustable in its position projects into the cavity or the central throttle point 5.

Via a radial bore 11 which connects the central throttle point 5 to the outside and has an internal thread 12, the adjustment screw 6 can be screwed into/unscrewed from the bore 11 and thus into/from the cavity/central throttle point 5. The channel system 4 is thus also closed in a pressure-tight manner to the outside via the adjustment screw 6.

The diameter of the adjustment screw 6 (and thus also the radial bore 11 with the internal thread 12) is smaller here than the diameter of the central throttle point/cavity 5.

The flow cross section 7 in the central throttle point 5 is changed by screwing in/unscrewing the adjustment screw, but without completely suppressing the flow in the channel system 4 via the central throttle point 5.

The particular dynamic rigidity and damping properties also arise here again in the tool holder 1.

Alternatively to said second embodiment, it can also be provided to connect one of the three chambers 3 only indirectly—via a second of the three chambers 3—to the central throttle point 5 (not illustrated). In this case, the supply channel 8 would then connect this one indirectly connected chamber 3 to the second chamber 3 and not (directly) to the central throttle point 5.

Moreover, furthermore alternatively, it is also possible for four or even more chambers 3 which are connected to one another via such channel systems 4 and the central throttle point 5, as described, to be provided in a tool holder 1.

Figure 3:
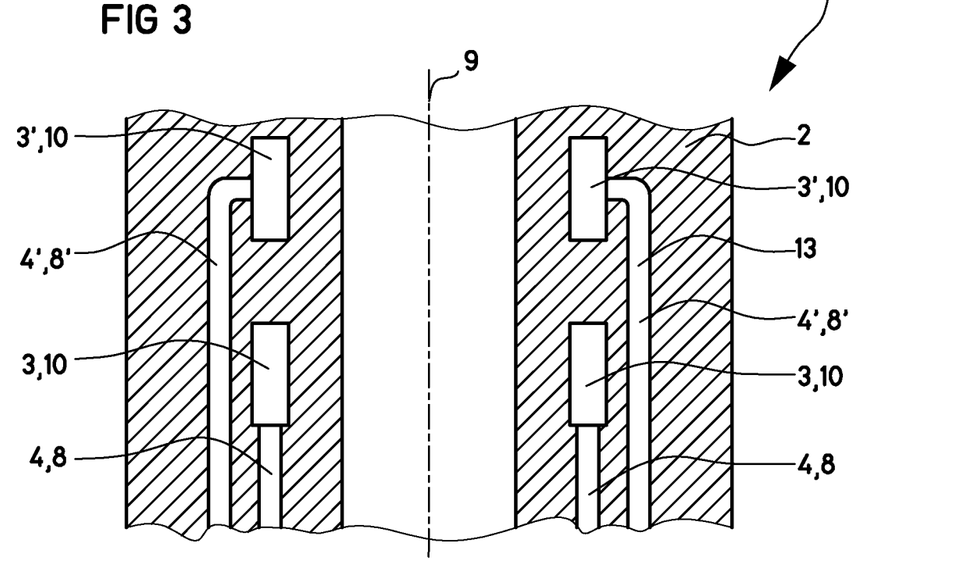
FIG. 3 shows a section through a clamping portion of a hydraulically clampable tool holder according to a third embodiment.
Figure 4:
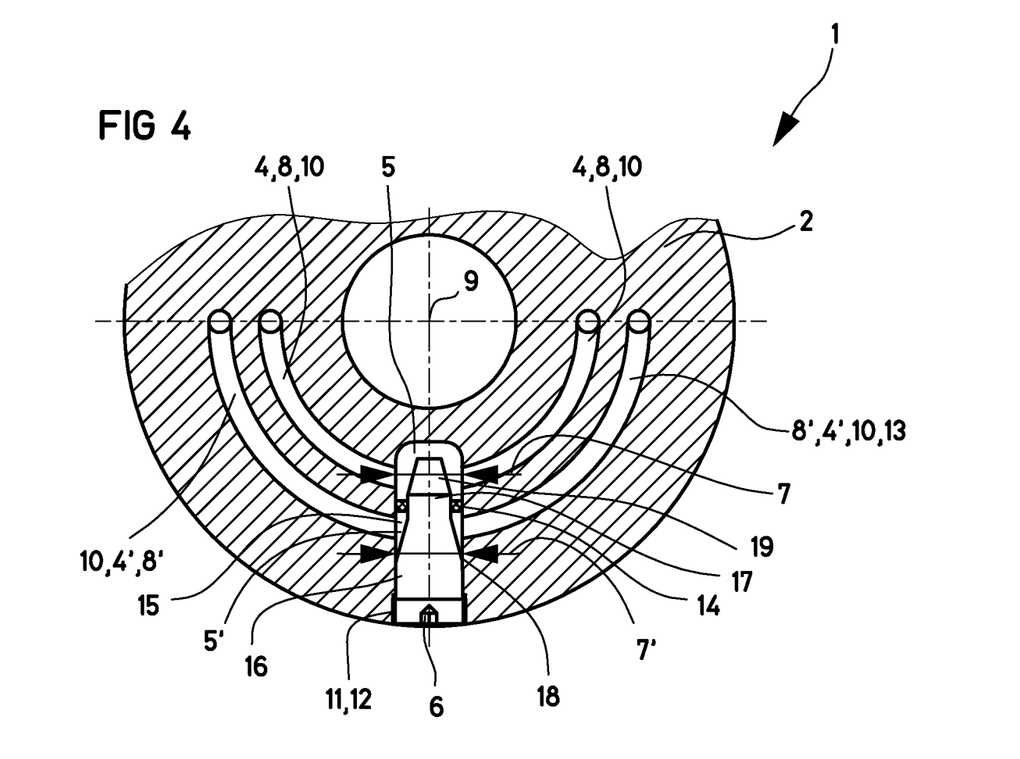
FIG. 4 shows a cutout of the tool holder according to FIG. 3 with an adjustment screw for two central throttle points.

FIG. 3 again shows a further embodiment of the tool holder 1—this time in a schematic longitudinal section/axial section through the clamping portion 2 of the tool holder 1. FIG. 4 shows an associated cutout of the tool holder according to FIG. 3 in a normal section.

This embodiment likewise differs from the first embodiment (according to FIG. 1) by the configuration of the chamber system 13; the latter in this case has two channel systems 4 and 4' (components of the second channel system are identified by "'").

Otherwise, the tool holder 1 is constructed as in the embodiment described previously in detail, and therefore mutually corresponding parts (also those followed by "'") are also provided with the same reference signs. With regard to the description thereof, reference is made to the first embodiment. Corresponding effects as in the tool holder 1 according to the first embodiment also arise here.

As FIG. 3 shows, two (separate) (pressure) chambers 3 and 3' which are uniformly distributed concentrically with respect to the longitudinal axis 9 and are in the form of annular portions are formed in each case in two axial heights/planes in the interior of the clamping portion 2 of the tool holder 1, said (pressure) chambers 3 and 3' also extending in the clamping portion 2 axially with respect to the longitudinal axis 9 of the tool holder (cf. similarly as in FIG. 1 for an axial height/plane).

The in each case two chambers 3 and 3' of an axial height are in each case fluidically connected to each other via a channel system 4 and 4' (cf. FIG. 3 and FIG. 4). That is to say, the two chambers 3 and 3' of an axial height are fluidically connected to each other via the channel system 4 and 4' (and the respective central throttle point 5 and 5'); a hydraulic medium/hydraulic fluid 10, such as oil, can flow to and fro between the chambers 3 and 3' (in each case of an axial height/plane) via the channel system 4 and 4' (and central throttle point 5 and 5').

The chambers 3/3' and the channel system 4/4' also again here form the chamber system 13 in the tool holder 1.

As FIG. 3 also shows, the channel system 4 and 4' (in each case) provides two supply channels 8 and 8'—in the form of bores running axially in some sections and furthermore concentric bores encircling in some sections, each of which connects one of the two chambers 3 and 3' to the respective central (throttle) point 5 and 5' in the channel system 4 and 4' (FIG. 3 and FIG. 4), via which central throttle point 5 and 5' the hydraulic medium 10 can thus flow to and fro between the two chambers 3 and 3'.

As illustrated in FIG. 4, the two central throttle points 5 and 5' are designed as a (common) radially running, cylindrical cavity 15, into which the in each case two supply channels 8 and 8' of the chambers 3 and 3' open laterally.

A common adjustment element 6—in the form of an adjustment screw—which is adjustable in its position projects into the (one common) cavity 15 or the two central throttle points 5 and 5'.

The two channel systems 4 and 4' are sealed and separated from one another by means of a seal 14 which is arranged in the common cavity 15 radially between the two central throttle points 5 and 5'. The hydraulic medium 10 located in the chamber system 13 can thus flow to and fro only in each case in the one channel system 4 or 4' between the two chambers 3 and 3' in this respect via the central throttle point 5 or 5'; but not between the two channel systems 4 and 4'.

Via a radial bore 11 which connects the common cavity 15 to the outside and has an internal thread 12, the adjustment screw 6 can be screwed into/unscrewed from the bore 11 and further into/from the common cavity 15 or the two central throttle points 5 and 5'. The chamber system 13 or the channel systems 4 and 4' is or are thus also closed in a pressure-tight manner to the outside via the adjustment screw 6.

As FIG. 4 shows, the common adjustment screw 6 has cylindrical portions (16, 17) in some portions and conical portions (18, 19) (alternating with the cylindrical portions 16, 17), wherein the common adjustment screw 6 is formed in such a manner (with respect to the common cavity 15) that the conical portions 18 and 19 lie in the region of the openings of the supply channels 8 and 8' into the common cavity 15 (very substantially independently of the screw-in depth of the common adjustment screw 6 into the common cavity 15).

The seal 14 sealing off the two channel systems 4 and 4' from each other lies against the cylindrical portion 17 of the common adjustment screw 6, which cylindrical portion is formed between the two conical portions 18 and 19 of the common adjustment screw 6.

The common adjustment screw 6 is furthermore formed, in its length, in such a manner that, if it is completely screwed into the common cavity 15, a distance remains to the cavity base.

At least in the region of the conical portions 18 and 19 and of the cylindrical portion 17, which is located in between, of the common adjustment screw 6, the diameters of the adjustment screw 6 are smaller than the diameter of the common cavity 15 or central throttle points 5 and 5'. That is to say, a gap remains between the common adjustment screw 6 and common cavity 15 (in the region of the central throttle points 5 and 5'), via which the hydraulic medium can flow to and fro between the chambers 3 or 3' of the respective channel system 4 or 4'.

The flow cross sections 7 and 7' in the central throttle points 5 and 5' change by screwing in or unscrewing the common adjustment screw 6—but without the flows in the channel systems 4 and 4' being completely suppressed via the central throttle points 5 and 5'.

The particular dynamic rigidity and damping properties also arise here again in the tool holder 1.

Alternatively to said chamber structure in the tool holder 1 according to FIG. 3 and FIG. 4, chamber structures having more than two chambers 3 (3') per axial plane, more than two chamber planes, other supply channel profiles in the clamping region 2 and/or any other, even asymmetrical chamber arrangements (with chambers 3 (3') even distributed asymmetrically) can also be provided.

Figure 5:
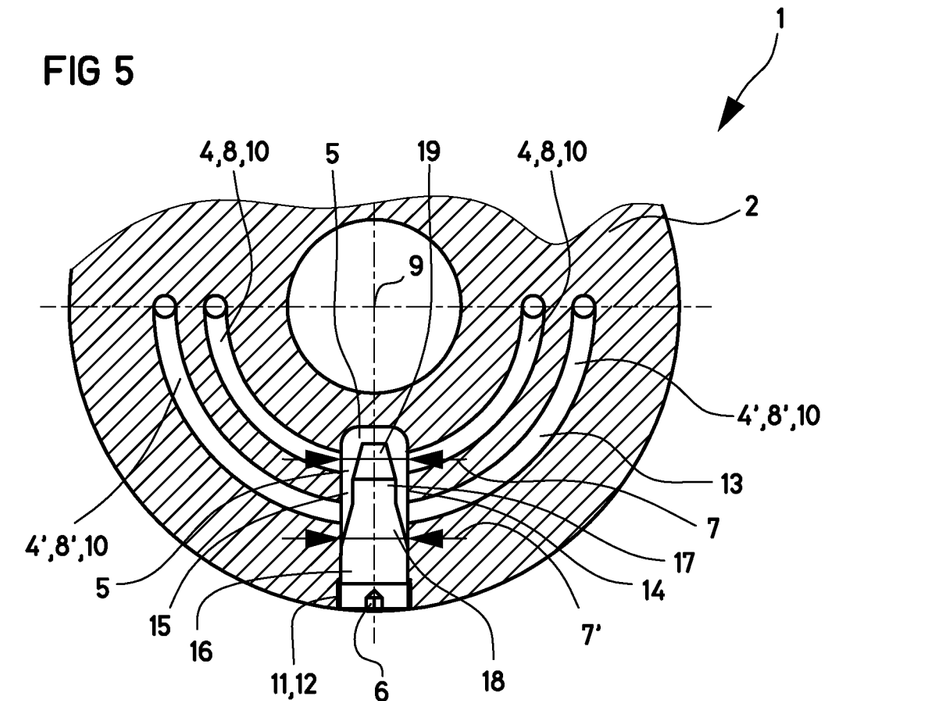
FIG. 5 shows a cutout of a modified tool holder with an integrated adjustment/clamping screw.

Referring now more particularly to FIG. 5, there is shown a modification of the embodiment of the tool holder 1 according to FIGS. 3 and 4, which modified tool holder is identical in respect of its chamber system 13 to that according to the embodiment of the tool holder 1 according to FIGS. 3 and 4 (number/arrangement/connection of the chambers), and therefore mutually corresponding parts (even those followed by '"') are also provided with the same reference signs. With regard to the description thereof, reference is made to the first embodiment. Corresponding effects as in the tool holder 1 according to the first embodiment also arise here.

The embodiment of the tool holder 1, as FIG. 5 clarifies, undergoes the modification with respect to the configuration of the common cavity 15 which is formed here (structurally and functionally) as an integrated clamping chamber/central throttle point 5.

The common adjustment screw 6 thus also becomes the clamping screw (with clamping piston) of the clamping system of the tool holder 1.

As FIG. 5 shows (corresponding to FIG. 4), the seal 14 is absent in the common cavity 15 (in relation to FIG. 4 or the embodiment of the tool holder 1 according to FIG. 4), as a result of which all of the chambers 3 and 3' are fluidically connected (directly) via the common cavity 15. The hydraulic medium 10 can flow to and fro between all of the chambers 3 and 3'—via the common cavity 15 (thus again also just one central throttle point 5 or 5' instead of two central throttle points 5 and 5') (correspondingly also one channel system 4 or 4' instead of two 4 and 4').

When the common adjustment screw 6 (now also clamping screw/clamping piston) is actuated, the hydraulic medium 10 is pressed (in a known manner) into the hydraulic clamping system, i.e. the chamber system 13, as a result of which—in this case in the case of the tool holder 1—the reduction in the flow cross section is brought about in the common cavity 15. The clamping portion 2 is clamped.

The simultaneous throttle action arises here because of the small remaining residual cross section between the common adjustment screw 6 and the supply channels 8 or 8' opening into the common cavity 15 or the central throttle point 5 (5').

As alternatives to the tool holders according to FIGS. 1 to 5, these embodiments can also be provided as workpiece holders.

The exemplary embodiment described below according to FIG. 6 relates to a hydraulically clampable workpiece holder 1 (only workpiece holder 1 below for short) which is generally also known as a hydraulically clampable clamping arbor. Workpieces are hydraulically chucked or held (not illustrated) by means of such a workpiece holder.

For this purpose, a hydraulic clamping member is arranged within a sleeve part, also called clamping portion 2 below, of such a workpiece holder 1, said hydraulic clamping member increasing its outside diameter when hydraulic pressure is applied, which can be built up/brought about, for example, via a hydraulic medium, such as oil, and thus frictionally clamping the workpiece sitting on the sleeve part.

The clamping portion 2 of the workpiece holder 1 described below is preferably produced by fused deposition modeling.

Figure 6:
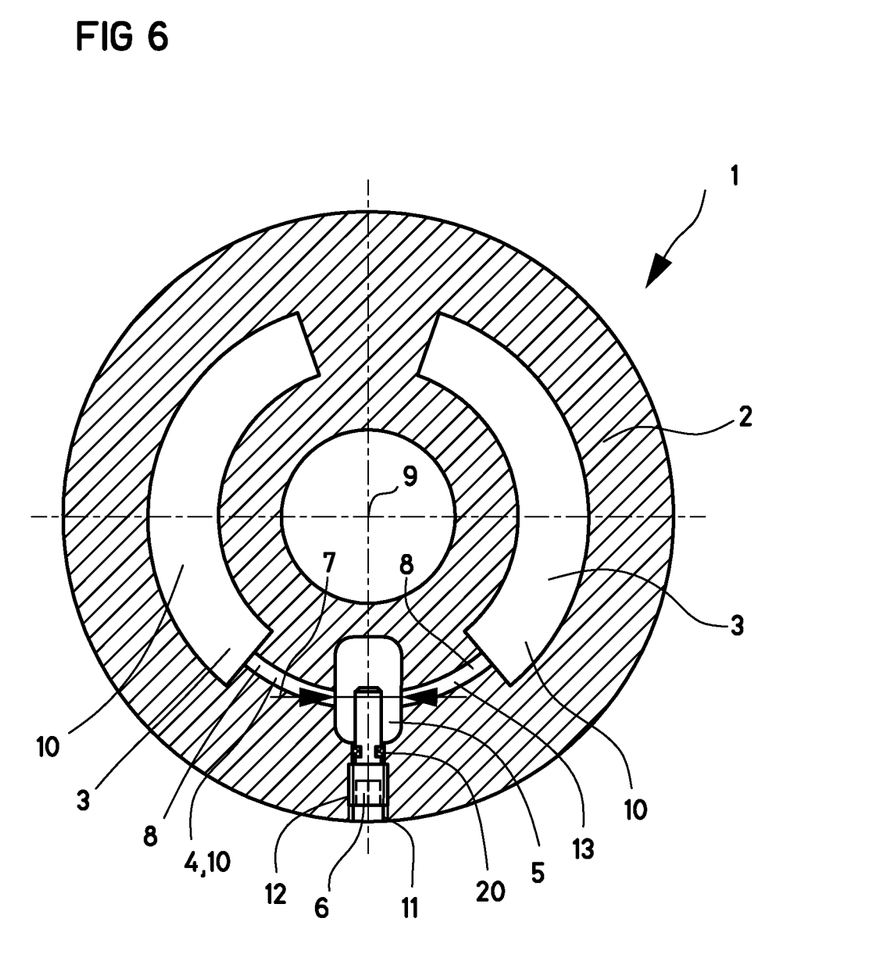
FIG. 6 shows a section through a clamping portion of a hydraulically clampable workpiece holder according to an embodiment.

Referring now more particularly to FIG. 6, there is shown a normal section (with respect to the longitudinal axis 9 of the hydraulically clampable workpiece holder 1) through the clamping portion 2 of such a workpiece holder 1.

As FIG. 6 shows, two (separate) symmetrical (pressure) chambers 3 which are in the form of annular portions concentrically with respect to the longitudinal axis 9 are formed in the interior of the clamping portion 2, said (pressure) chambers also extending in the clamping portion 2 axially concentrically with respect to the longitudinal axis 9 of the workpiece holder.

The two chambers 3 are fluidically connected to each other via a channel system 4 (lying in the sectional plane). That is to say, the two chambers are fluidically connected to each other via the channel system 4 (and the central throttle point 5 described below); a hydraulic medium/hydraulic fluid 10, such as oil, can flow to and fro between the two chambers 3 via the channel system 4 (and the central throttle point 5).

The chambers 3 and the channel system 4 thus also form the chamber system 13 in the workpiece holder 1.

The channel system 4 provides two supply channels 8—in the form of concentric bores encircling in some sections, each of which connects one of the two chambers 3 to a central (throttle) point 5 in the channel system 4 ("separate supply channels"), via which central throttle point 5 the hydraulic medium 10 can (or has to) flow to and fro between the two chambers 3.

The central throttle point 5 is designed as a radially running cylindrical cavity, into which the two supply channels 8 of the chambers 3 open laterally.

An adjustment element 6—in the form of an adjustment screw—which is adjustable in its position projects into the cavity or the central throttle point 5.

Via a radial bore 11 which connects the central throttle point 5 to the outside and has an internal thread 12, the adjustment screw 6 can be screwed into/unscrewed from the bore 11 and thus into/from the cavity/central throttle point 5. The channel system 4 is thus also closed in a pressure-tight manner to the outside via the adjustment screw 6. A seal 20 can also be provided for this purpose.

The diameter of the adjustment screw 6 (and thus also the radial bore 11 with the internal thread 12) is smaller here than the diameter of the central throttle point/cavity 5, as a result of which a "flowing to and fro" of the hydraulic medium 10 in the chamber system 13 is maintained in the event of a variable flow resistance in the central throttle point 5.

The flow cross section 7 in the central throttle point 5 is changed by screwing in or unscrewing the adjustment screw, but without completely suppressing the flow in the channel system 4 via the central throttle point 5.

The interior of the central throttle point 5 can also be designed, differently than illustrated, as a hollow cone running radially (at least in sections). The adjustment screw 6 can also be designed (at least in sections) conically/in a cone-shaped manner (corresponding to the hollow cone).

Irrespective of the channel system 4 connecting the two chambers 3 and the throttle point 5 thereof which is adjustable/changeable in its flow cross section by means of the adjustment screw 6, the chamber system of the workpiece holder 1 also provides a pressure chamber (not illustrated) (which is customary per se) and is also fluidically connected to the chamber system and has a clamping screw/clamping piston which is arranged there and is actuable from the outside, for building up pressure for/and clamping the workpiece holder 1 (not illustrated).

For this purpose, for example, one of the two chambers 3 of the workpiece holder 1 can be connected (not illustrated) to the clamping chamber via a further (pressure) channel.

By actuation of the clamping screw/clamping piston, the hydraulic medium is pressed into the chamber system 13 and (clamping) pressure is built up, as a result of which the clamping portion 2, i.e. specifically an outer wall of the sleeve part, arches outward.

Alternatively, in a corresponding configuration of the sleeve part, a workpiece can also be clamped inward.

Furthermore, alternatively to the workpiece holder provided according to FIG. 6, this embodiment can also be provided as a tool holder.

Although the invention has been illustrated and described more specifically in detail by means of the preferred exemplary embodiments, the invention is not restricted by the disclosed examples and other variations can be derived therefrom without departing from the scope of protection of the invention.

The following is a list of reference numerals and symbols used in the above description of the invention with reference to the drawing figures:

1 Device for hydraulically clamping tools/workpieces, hydraulically clampable tool holder/workpiece holder
2 Clamping portion
3, 3' Chamber
4, 4' Channel system
5, 5' Central throttle point
6 (Common) adjustment element, (common) adjustment screw
7, 7' Flow cross section
8, 8' Supply channel
9 Longitudinal axis
10 Hydraulic medium, oil
11 (Radial) bore
12 Internal thread
13 Chamber system
14 Seal
15 Common cavity
16 Cylindrical portion
17 Cylindrical portion
18 Conical portion
19 Conical portion
20 Seal

The invention claimed is:

1. A device for hydraulically clamping tools or workpieces, the device comprising:
 a clamping portion for clamping a tool or a workpiece, said clamping portion having an interior with a plurality of chambers;
 a channel system fluidically connecting said plurality of chambers, said channel system connecting said plurality of chambers has a plurality of supply channels, and each of said plurality of supply channels leads only to a respective one of said chambers;

a central throttle point arranged in said channel system; and an adjustment element configured for selectively changing a flow cross section in said central throttle point; and a first supply channel end of the respective supply channel ends in the one chamber and a second supply channel end of the respective supply channel ends in said central throttle point.

2. The device according to claim 1, wherein said adjustment element is an adjustment screw.

3. The device according to claim 2, wherein said adjustment screw is formed with one or more conical portions and/or a cross section of said adjustment screw is smaller than a cross section of said central throttle point.

4. The device according to claim 1, wherein said central throttle point is a cylindrical cavity.

5. The device according to claim 1, wherein a plurality of chambers are arranged in an axial plane.

6. The device according to claim 5, wherein said plurality of chambers are uniformly distributed in a circumferential direction and/or concentrically with respect to a longitudinal axis of the device, and/or said plurality of chambers are arranged in a plurality of axial planes in said clamping portion.

7. The device according to claim 1, wherein one of said plurality of chambers is a cavity in the shape of an annular portion and/or a supply channel is a bore.

8. The device according to claim 1, wherein said central throttle point is connected outwardly via a bore.

9. The device according to claim 8, wherein said throttle point is closed in a pressure-tight manner via said bore.

10. The device according to claim 1, wherein said clamping portion is produced additively.

11. The device according to claim 1, wherein said channel system is one of at least two channel systems each having a throttle point and wherein the flow cross sections of said central throttle points of said at least two channel systems can be changed using a single common adjustment element.

12. The device according to claim 1, wherein said central throttle point is a clamping chamber and/or the adjustment element is a clamping screw of a hydraulic clamping system in the hydraulically clampable tool/workpiece holder.

* * * * *